Nov. 12, 1940. T. M. FARLOW 2,221,185
POWER GENERATING UNIT
Filed May 12, 1938
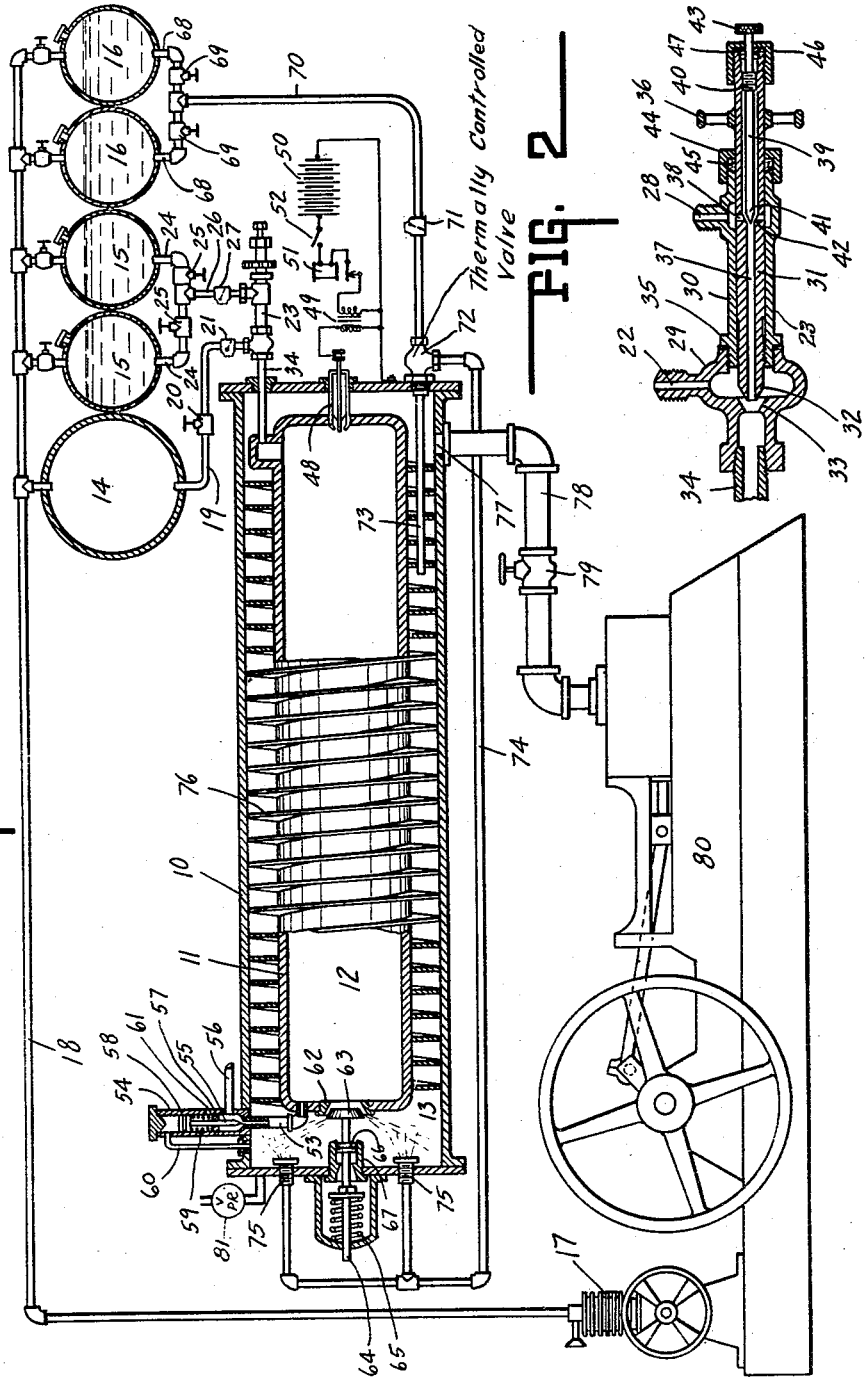
INVENTOR.
THOMAS M. FARLOW.
BY Lockwood, Goldsmith & Galt,
ATTORNEYS.

Patented Nov. 12, 1940

2,221,185

UNITED STATES PATENT OFFICE 2,221,185

POWER GENERATING UNIT

Thomas Marshall Farlow, Manilla, Ind.

Application May 12, 1938, Serial No. 207,428

3 Claims. (Cl. 60—46)

This invention relates to a power generating unit of the type adapted to generate steam in the presence of highly heated products of combustion and in which the mixture of steam and combustion gases may then be used in a steam engine or turbine of conventional type.

In the preferred form of the invention there is provided a combustion chamber in which a suitable fuel may be burned and an evaporation chamber having a heat transfer relation with the combustion chamber. The combustion gases are permitted to pass from the combustion chamber into the evaporation space, water to be vaporized is sprayed into the evaporation space and the resulting water vapor is commingled with the exhaust gases.

One object of the invention is to provide a power generating unit of a small size in comparison to conventional steam boilers of the same power rating.

Another object of the invention is to provide improved means by which the water vapor may be formed substantially instantaneously upon the injection of the water.

Another object of the invention is to prevent the accumulation of water in the liquid state in the evaporation chamber.

Another object of the invention is to provide improved means for preventing the accumulation of unburned fuel mixture in the combustion chamber in the event of failure of combustion.

Another object of the invention is to provide improved means for controlling the passage of combustion gases from the combustion chamber to the evaporation chamber.

Another object of the invention is to provide improved means for forming a fuel mixture and injecting the same into the combustion chamber.

Another object of the invention is generally to improve the heat transfer efficiency between the combustion chamber and the evaporation chamber so that the mixture of combustion gases and steam may be supplied at the highest desirable pressure and temperature.

Other objects and features of the invention will be understood from the accompanying drawing and the following description and claims:

Fig. 1 is an elevational view partly diagrammatic of a complete power generating unit built in accordance with the invention with parts in section and other parts cut away. Fig. 2 is a central sectional view of an improved fuel injector forming a part of the invention.

In the preferred form of the invention shown in the drawing by way of illustration, the generator proper consists of an outer shell 10 and an inner shell 11. The inner shell 11 defines a combustion chamber 12 and the space 13 between the inner and outer shells defines an evaporation chamber. A tank 14 is provided for the accumulation of compressed air for fuel injection. A pair of tanks 15 are provided for fuel supply and a pair of tanks 16 are provided for water supply. An air compressor 17 delivers compressed air through a pipe 18 to the supply tank 14 and also to the tanks 15 and 16 to maintain the contents thereof at a suitable pressure for injection. A pipe 19 having a control valve 20 and a check valve 21 therein supplies compressed air to the air inlet port 22 of a fuel injector 23, a cross section of which is shown in Fig. 2. Pipes 24, each having a control valve 25 therein, supply fuel from the tanks 15 to a pipe 26 which delivers said fuel through a check valve 27 to a fuel inlet port 28 of the fuel injector.

The fuel injector includes a housing 29 containing the air inlet port 22 and a second housing 30 containing the fuel inlet port 28, said housings being threadedly connected as shown in Fig. 2. Within the housing 30 there is fitted a valve stem 31, the pointed end 32 of which cooperates with a valve seat 33 formed within the housing 29 to control the flow of air from the air inlet duct 22 to a pipe 34 leading to the combustion chamber 12. The valve stem 31 is threadedly engaged with the housing 30 at 35 and thus may be moved longitudinally by rotation thereof to adjust the volume of air flow. A hand wheel 36 is secured to the outwardly extending end of the valve stem 31 for convenience of adjustment.

The valve stem 31 is provided with a central fuel duct 37 having ports 38 communicating with the fuel inlet duct 28 irrespective of the adjusted position of the valve stem 31. A valve stem 39 is threadedly engaged at 40 with the interior of the valve stem 31 and is provided with a pointed end 41 cooperating with a valve seat 42 to control the flow of fuel. The outwardly projecting end of the stem 39 is provided with a knob 43 for purposes of adjustment. A packing gland 44 containing packing material 45 seals the end of the casing 30 to prevent leakage of fuel or air. A similar gland 46 containing packing 47 seals the open end of the stem 31.

A spark plug 48 extends into the combustion chamber 12 and may be supplied with high tension current by an induction coil 49. The induction coil is energized by a battery 50 which supplies current to the primary winding thereof through a common form of make-and-break device 51. A switch 52 controls the operation of the spark plug which in the usual case need be used only in starting the operation of the generator. Thereafter, the combustion is self-sustaining.

In order to prevent an accumulation of unburned fuel mixture in the chamber 12 in the event of failure of combustion, there is provided a conduit 53 leading to a housing 54 which contains a needle valve 55 suitable for controlling flow through the conduit 53. Fuel mixture discharged into the casing 54 may be discharged into a pipe 56 which may lead to any suitable point for a safe disposition of said fuel mixture. The casing 54 is divided by a partition 57 through which the valve 55 projects. Above said partition the valve 55 is connected to a piston 58 which is upwardly pressed by a spring 59. A conduit 60 leads from the evaporation space 13 to the space above the piston 58. The space beneath said piston is vented to the atmosphere by a vent opening 61. The pressure of the spring 59 is sufficient to maintain the needle valve 55 in an open position in the absence of a predetermined pressure in the evaporation chamber 13. When the pressure in said evaporation chamber exceeds said predetermined amount, the valve 55 is forced downwardly to close the conduit 53 and prevent escape of said fuel mixture.

In the end of the shell 11, remote from the fuel injector 23, there is provided a valve seat 62 with which there is associated a valve 63. Said valve is mounted on a stem 64 which projects outside of the shell 10 and is inwardly pressed by a spring 65. Said stem also carries a piston 66 operating in a cylinder 67, the outer end of which is open to the atmosphere.

In the idle condition of the generator, the valve 63 is closed by pressure of the spring 65. An increase of pressure within the combustion chamber sufficient to compress said spring results in the opening of the valve 63 to a full open position in which there is little or no pressure drop through the valve. The amount of valve opening necessary depends upon the diameter of the valve and the volume of gases generated in the chamber and discharged through the valve. For a large volume of gas and a small valve it may be necessary to move the valve wholly within the chamber 13. When the valve is sufficiently large, the maximum gas flow through the valve may be obtained with practically no pressure drop and with a relatively small valve movement as shown in the drawing. In either case the valve 63 acts as a baffle to spread the flame and hot gases issuing from combustion chamber 12 in the form of a conical sheet. The opening of the valve results in an immediate increase in the pressure in said evaporation space which acts upon the piston 66 to prevent the valve 63 from again being closed unless said pressure falls to a predetermined amount above atmospheric pressure. Thus said valve is differentially operated to open in response to a difference in pressure between the combustion space 12 and the evaporation space 13, but is differentially operated to be closed in response to the difference in pressure between the evaporation space 13 and the atmosphere.

Water for injection into the evaporation space is supplied by pipes 68, each of which is fitted with a control valve 69, to a pipe 70. The pipe 70 is provided with a check valve 71 and leads to a thermally operated valve 72. Said valve is controlled by a thermal element contained in a tube 73 which projects into the evaporation space 13 and is opened to supply more water as the temperature in said space rises and to supply less as said temperature falls. Water from the valve 72 is supplied through a pipe 74 to a pair of spray nozzles 75 located in the head of the shell 10. Said spray nozzles discharge directly into the sheet of flame or hot gases passing the valve 63. The evaporation, therefore, is substantially instantaneous so long as the proper ratio is maintained between the water supply rate and the discharge of combustion gases.

About the outer surface of the shell 11, there is formed a helically arranged fin or baffle 76 which conducts the mixture of combustion gas and water vapor in a tortuous path about the heat transfer surface of the shell 11 and leads said mixture to a discharge port 77 adjacent the opposite end of the shell 10. Since the evaporation space 13 entirely surrounds the combustion space 12, all of the heat generated in said space must either be discharged into the evaporation space past the valve 63 or be added to the gases and water vapor by heat transfer through the shell 11. The tortuous path formed by the fin 76 provides intimate contact of the mixture with the entire surface of the shell 11. This insures that there will be no accumulation of unevaporated water in the evaporation space 13 and that the mixture will be discharged at the port 77 at as high a temperature and pressure as may be desirable. Since there is no accumulation of unevaporated water, the water vapor may be discharged in a super heated condition. The mixture of water vapor and gases may be supplied through a header 78 and a throttle valve 79 to a steam engine 80, or other suitable apparatus for converting the heat energy therein into mechanical energy.

In the operation of the apparatus the air compressor 17 is first operated from an electric motor or other external source of power to charge the tanks 14, 15 and 16 to the proper operating pressure. By operation of the valve 20 and one of the valves 25 and the proper adjustment of the needle valves 31 and 41, a combustible mixture of fuel and air is supplied to the combustion space 12. The switch 52 is then operated to ignite the mixture. In the event that ignition fails, no pressure will be built up in the chamber 12 since the fuel mixture may escape into the conduit 53 which is of substantially the same capacity as the fuel pipe 34. If, however, combustion takes place, the combustion products have so much greater volume than the volume of the incoming fuel mixture that they cannot escape rapidly enough through the conduit 53 to prevent the building up of sufficient pressure within the combustion space 12 to open the valve 63. Upon the opening of the valve 63, sufficient pressure is obtained in the evaporation space 13 to close the needle valve 55 and prevent further escape of gases from the combustion space.

After combustion is started, one of the valves 69 may be opened to provide for water supply. When the temperature at the thermal element 73 reaches a predetermined degree, the valve 72 is opened to inject water through the spray nozzles 75. The evaporation of said water and the continued supply of combustion gases increases the pressure in the evaporation chamber 13 to the desired operating pressure. There-upon, the valve 79 may be opened and the engine 80 may be placed in operation.

A suitable safety valve 81 may be installed on the shell 10 to prevent excessive pressures therein. In the continuous operation of the apparatus one of the fuel tanks 15 and one of the water tanks 16 may be in service while the second tank 15 and the second tank 16 are being filled. There is thus no need of a shut down for refueling or for replenishing the water supply.

From the foregoing specification it will be apparent that the invention provides a means by which practically all of the heat generated in the combustion chamber is supplied to the working fluid delivered to the engine. The temperature and pressure of the working fluid may be controlled by proper adjustment of the amount of water injected by the valve 72. The efficiency of heat transfer between the combustion space and the evaporation space is high since the former space is completely enclosed in the latter and since the fin 76 forces the working fluid to traverse substantially the entire area of the shell 11.

The invention claimed is:

1. In a power generating unit of the type described having a combustion space and an evaporation space, a pressure relief valve communicating with said combustion space and adapted to prevent excessive pressure therein, and means responsive to the pressure in said evaporation space for rendering said valve inoperative to relieve said excess pressures when said last mentioned pressure exceeds a predetermined pressure.

2. In a power generating unit of the type described having a combustion space and an evaporation space, means forming a passage for escape of gases or vapor from said combustion space, a valve controlling flow through said passage, and pressure responsive means communicating with said evaporation space and operating to close said valve in response to an increase in pressure in said evaporation space.

3. In a power generating unit of the type described having a combustion chamber and an evaporation chamber, the combination of means forming a port for discharge of combustion products from the combustion chamber to the evaporation chamber, a valve controlling flow through said port and serving, when open, to deflect the stream of hot gases issuing therefrom around said valve in the form of a conically shaped sheet, and means for spraying water directly into said sheet.

THOMAS MARSHALL FARLOW.